May 27, 1924.
G. CLAUSING
SAW SETTING MACHINE
Filed June 6, 1923    2 Sheets-Sheet 1
1,495,249
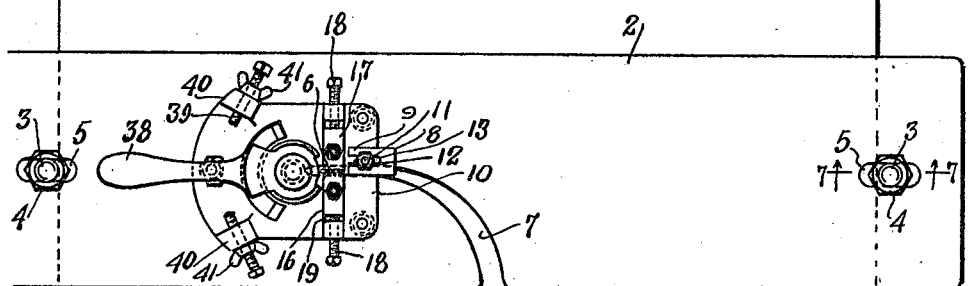
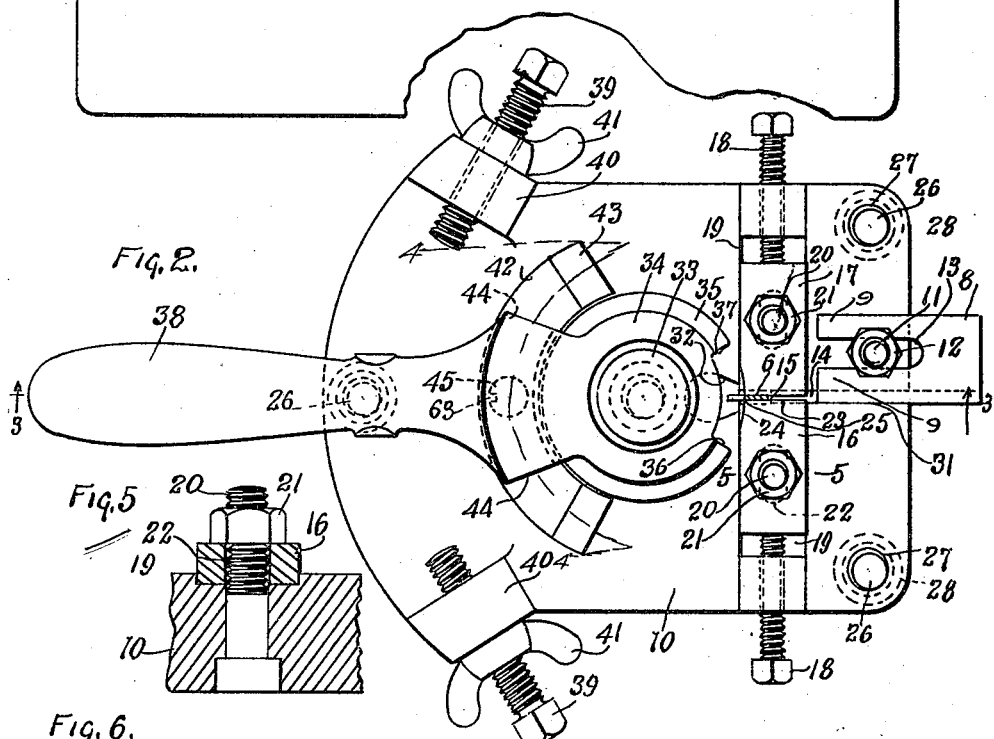
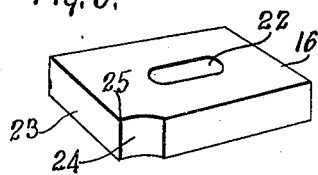
INVENTOR.
George Clausing,
BY
ATTORNEYS.

May 27, 1924.
G. CLAUSING
SAW SETTING MACHINE
Filed June 6, 1923    2 Sheets-Sheet 2
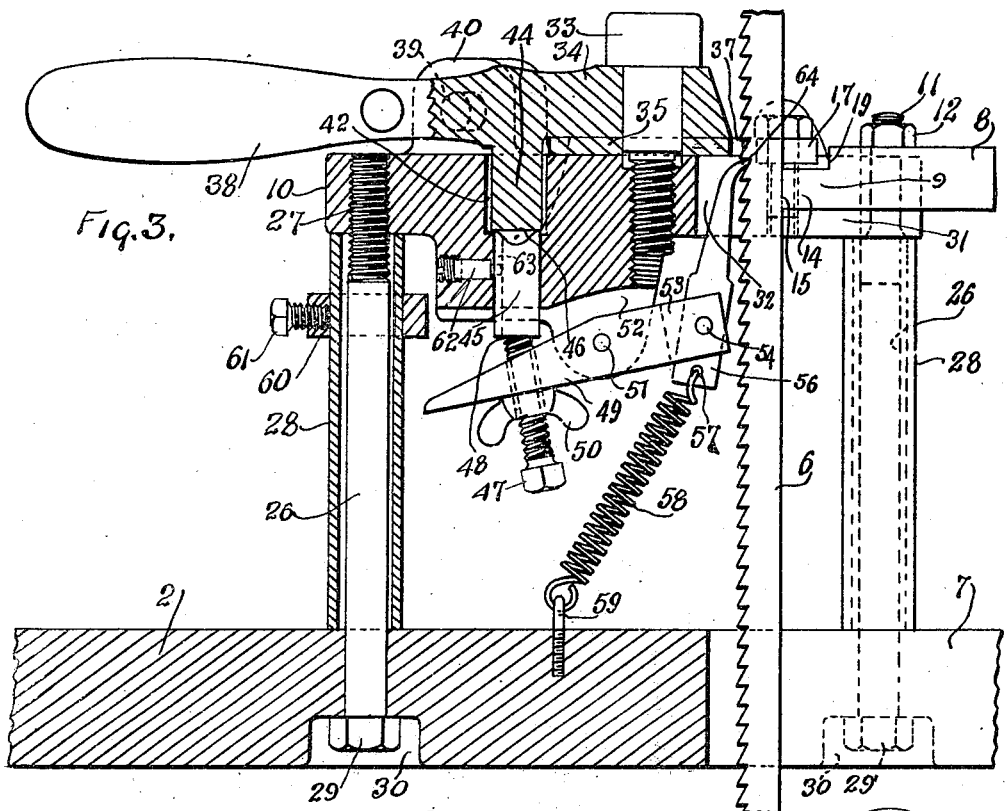
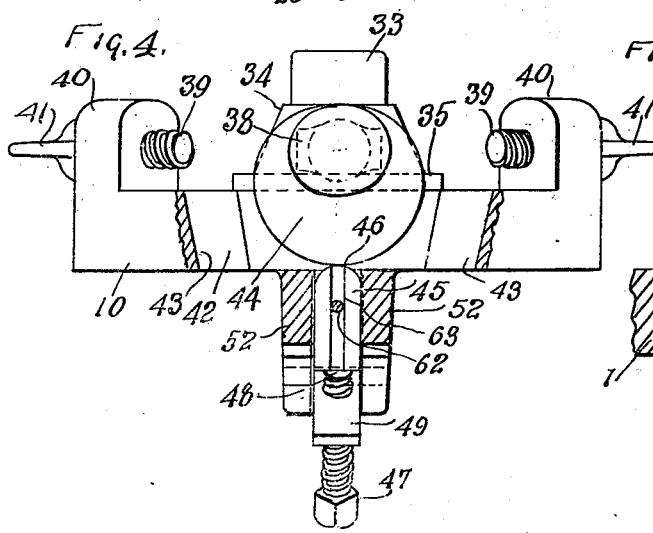
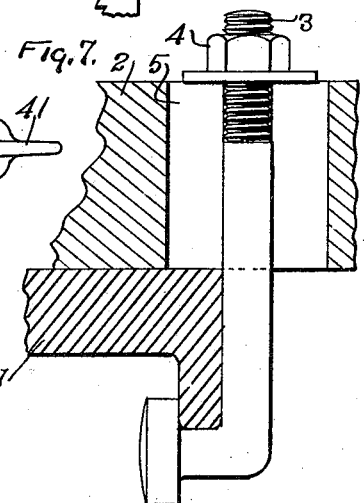
INVENTOR.
George Clausing, Patented May 27, 1924.

1,495,249

UNITED STATES PATENT OFFICE.

GEORGE CLAUSING, OF PORTSMOUTH, OHIO, ASSIGNOR TO THE VULCAN LAST COMPANY, OF PORTSMOUTH, OHIO, A CORPORATION OF OHIO.

SAW-SETTING MACHINE.

Application filed June 6, 1923. Serial No. 643,608.

*To all whom it may concern:*

Be it known that I, GEORGE CLAUSING, a citizen of the United States, residing at Portsmouth, in the county of Scioto and State of Ohio, have invented certain new and useful Improvements in Saw-Setting Machines, of which the following is a specification, reference being had therein to the accompanying drawing.

My invention relates to the setting of saws, and to a machine for that purpose.

It is the object of my invention to provide a saw-setting machine particularly useful for band-saws, for setting the teeth thereof a predetermined amount automatically.

It is a further object of my invention to provide a portable saw-setting machine or mechanism, which may be transported to the place where the band-saw is located, and which may be mounted upon the saw table adjacent the saw without disturbing the saw and its mountings. It is a matter of great advantage to be able to set the saws in their permanent locations, without the necessity of demounting them from their machines in which they are located.

It is a further object of my invention to provide a saw-setting machine which is not only light, strong, and portable, but which has few parts, readily adjustable to varying sizes and types of saws, and which will move the teeth of the saws a predetermined amount and the same distance for each tooth of the saw, so as to give uniformity to the setting of the teeth.

It is an additional object to provide an adjustable saw-setting machine.

It is a further object to provide a saw-setting machine which will automatically move the saw for each new setting of each tooth thereof.

Referring to the drawings:

Figure 1 is a plan view of the machine embodying my invention, mounted upon a saw table.

Figure 2 is an enlarged plan view of my saw-setting mechanism.

Figure 3 is a section on the line 3—3 of Figure 2.

Figure 4 is a section at right angles to the section of Figure 3 on the line 4—4 of Figure 2.

Figure 5 is a section on the line 5—5 of Figure 2, showing the method of installing the saw-holding block, which prevents the lateral movement of the saw.

Figure 6 is a perspective of this block, showing one end partially cut away to form a sharp supporting edge against which the tooth of the saw is bent.

Figure 7 is a detail showing the preferred form of retaining clamp or bolt for retaining the portable support on a saw table.

Referring to the drawings in detail:

1 is a saw table or a table adjacent to a band-saw in any form of conventional machine employing a band-saw and the like. Mounted upon this table is the supporting board 2, upon which my mechanism for the setting of saws is mounted. This board 2 is retained on the table 1 by bolts 3 and nuts 4. These bolts are adapted to be moved in the slots 5 in the board 2 for adjustment to varying sizes of tables 1.

In order to accommodate the saw, such as the band-saw 6, a slot 7 is provided in the board 2, so that the saw may be brought adjacent to the setting mechanism hereinafter described. When this operation takes place, the retaining block 8, which is a U-shaped block having the arms 9—9, is removed from the saw-setting table 10. When the saw is in position, as shown in the several figures, to be operated upon by the saw-setting mechanism, the block is restored to the position shown and clamped in position by the bolt 11 and the nut 12.

The bolt 11 fits in the slot 13 between the arms 9. A projecting finger 14 carried by this block 8 engages at 15 with the rear edge of the saw 6, thus definitely aligning and positioning it in its vertical trap hereinafter described.

This finger 14 projects beneath the blocks 16 and 17. These blocks are adjusted laterally by the set screws 18 carried by the saw table 10. The blocks themselves travel in grooves 19 in the surface of the table 10. They are retained in these grooves by the bolts 20 and the nuts 21.

The bolt 20 in a guide block such as 16 is located in a slot 22, so that the block may be moved laterally relative to the bolt (which is stationary) by the set screw 18. This lateral movement permits of the withdrawing or advancing of the block so that its face 23 may engage with the saw 6 in co-operation with the adjoining face of the adjoining block, thus locating laterally the position of the saw. The ends of the block adjacent the saw teeth are cut away as at 24, and case-hardened, so that a sharp edge 25 adjacent the base of each tooth is provided at the time the bending operation upon the saw tooth takes place.

The table 10 is supported above the board 2 by standards consisting of the bolts 26, which are attached to the table 10 by their threaded heads 27. These bolts are encased in sleeves 28 which are interposed between the board 2 and the table 10. The bolt heads 29 located in the board 2 are countersunk in the cut-away portions 30 in the bottom of the board 2.

As hereinbefore described, the saw 6 is located in the slot 7 in the board 2. The table 10 is provided with a slot 31, which is enlarged at its inner end, as at 32. Adjacent this enlarged portion of the slot are located the blocks 16 and 17, and in the slot itself behind the saw is located the finger 14 carried by the sliding block 8.

Mounted on this table 10, on a pivot bolt 33, is a reciprocating block 34. This block carries with it, beneath it, between it and the table 10, a segmental hardened plate 35, the free ends of which at 36 and 37 are adapted to engage with alternate teeth of the saw for moving those teeth a predetermined distance to set them, so that as the mutilated plate 35 and the block 34 are reciprocated on the bolt 33, this alternate setting of the teeth will take place.

A handle 38 is connected to the block 34, to reciprocate it. To limit the movement of the handle, I provide the screws 39 mounted in the bosses 40 and locked in position by the wing-nuts 41. Beneath the handle there is a semi-circular slot 42 in the table 10, provided with beveled ends 43. There is carried on the under side of the handle 38 a cam 44, projecting into the slot 42. This cam is substantially circular, as will be seen in Figure 4. The high point of the cam is located directly over a reciprocating pin 45, which has its head 46 located in the bottom of the slot 42 in the table 10 at the time that the handle is in its central position, as in Figure 2. As the handle moves from side to side, this pin or plunger 45 is allowed to rise or is caused to descend by the engagement of 46 with the surface of the cam 44. The depression of the plunger 45 is effected by the cam. The plunger is caused to follow the cam when the plunger rises due to the following mechanism:

The head of a set-screw 47, as at 48, engages with the bottom of the plunger. This set-screw is fixed in the free end of a rocking lever 49 by the wing-nut 50. This rocking lever 49 is pivoted at 51 between a pair of ears 52 carried on the under side of the table 10. The other end of this rocking lever is provided with a jaw 53, in which there is pivoted at 54 a pawl 56. The lower end of this pawl is connected at 57 to a helical spring 58, which in turn is anchored at 59 to the table 2. This spring resists the upward movement of the pawl and lever, and causes the end of the set-screw 47 to bear against the bottom of the plunger 45 and force it upwardly against the cam 44. This upward movement is limited by the end 49 of the lever coming in contact with a stop 60, carried on the sleeve 28. This stop may be adjusted by the set-screw 61 to any desired position. The plunger is prevented from rotating by the pin 62, which projects into a slot 63 in the plunger 45.

The upper end of the pawl, as at 64, engages with the teeth of the saw 6.

The purpose of this pawl is to move the saw tooth by tooth and step by step upwardly, so that at each stroke of the saw-setting plate the tooth so set will be moved out of position and a new unset saw tooth moved into position for setting.

*Operation.*—The first step in the operation of my saw-setting mechanism, is to place the mechanism upon the saw table, and then move it into position, so that the saw is inserted in the slot 7, the blocks 16 and 17 being retreated and the block 8 removed. The bolts 3 are then adjusted to lock the board 2 to the table 1. Any desired form of clamp may be used for this purpose. Then the block 8 is located in position, and fastened as desired. The blocks 16 and 17 are adjusted in close engagement with the saw, and then the handle 38 with its setting plate 35 is ready to operate.

When the handle is moved in one direction, the face 37 of a saw-setting plate 35 sets the tooth in its path to the proper angle. The handle is then moved in the other direction, and while this takes place the high point of the cam 44 depresses the plunger 45, and in doing so rocks the lever 49, elevating the end 53 thereof against the resisting spring 58, so that the pawl 56 will move the saw upwardly one step, so that a new tooth will be in position to be engaged with the other saw-setting surface 37 of the saw-setting plate, when the handle is moved to the limit in the opposite direction from that in which it has already been moved.

Thus a tooth is set, and while the mechanism is being moved to set a new tooth, the tooth which has been set is moved out of position, and the unset tooth is moved into position.

By this reciprocation of the handle 38, the setting of the teeth takes place automatically to a predetermined degree as desired. The extent of the setting is regulated by the movement of the handle, and the movement of the handle is limited by the set-screws 39.

Due to the fact that the bolt 33 is detachable, and the block 34 is detachable from the plate 35, new saw-setting plates may be installed quickly, so that any new type of plate or any worn plate may be substituted or adjusted.

It will be understood that I do not desire to confine myself to the details of my invention as herein described, but comprehend within the claims such suitable modifications as may be necessary to adapt it to varying conditions of operation and use.

Having thus fully described my invention, what I claim as new, and desire to secure by Letters Patent, is:

1. In a saw-setting machine, a portable support adapted to be mounted upon a machine carrying a saw, a slot in said support for accommodating the saw, a guiding means carried by said support for said saw, for definitely positioning and locating it, means for setting the teeth on said saw, and means for moving said saw step by step between each setting operation, said means being carried by said support, whereby a saw may be set by a portable saw-setting mechanism without disturbing the saw when located on a machine.

2. In a saw-setting machine, a portable support adapted to be mounted upon a machine carrying a saw, a slot in said support for accommodating the saw, a guiding means carried by said support for said saw, for definitely positioning and locating it, means for setting the teeth on said saw, means for moving said saw step by step between each setting operation, said means being carried by said support, whereby a saw may be set by a portable saw-setting mechanism without disturbing the saw when located on a machine, and means to clamp said portable support to the machine in which the saw is located.

3. In a saw-setting machine, a support adapted to accommodate a saw, a saw-setting table mounted on said support, said table being spaced from the support, a reciprocating saw-setting means pivotally mounted on said table, and means connected therewith and actuated thereby for moving the saw step by step to present a new tooth to be worked upon by the saw-setting means between each saw-setting operation.

4. In a saw-setting machine, a support adapted to accommodate a saw, a saw-setting table mounted on said support, said table being spaced from the support, a reciprocating saw-setting means pivotally mounted on said table, means connected therewith and actuated thereby for moving the saw step by step to present a new tooth to be worked upon by the saw-setting means between each saw-setting operation, and means for adjustably limiting the degree of reciprocation to control the saw-setting means and the step-by-step mechanism.

5. In a saw-setting machine, a portable table, a saw-setting table mounted thereon, a slot in said support and a slot in said table coinciding with one another for the accommodation of a saw, said table being spaced from said support, means for maintaining said spaced relationship, a setting block adapted to be adjusted to engage with said saw on either side thereof, a setting block adapted to engage with the rear of said saw, a saw-setting plate pivotally mounted on said table and adapted to engage with the teeth of said saw, a handle to actuate said plate, means to limit the movement of said handle, a cam carried by said handle, a plunger engaging therewith, a pawl adapted to be actuated by said plunger when moving in one direction, yielding means adapted to actuate said pawl and plunger in the other direction, and means to connect said pawl and said plunger to one another, to synchronize said movements, whereby as the saw-setting plate is reciprocated on the table the saw is moved step by step between saw-setting operations by the engagement of the pawl with the teeth of the saw in succession.

6. In a saw-setting machine, a saw-setting table adapted to accommodate a saw moving vertically therethrough, adjustable guide blocks engaging either side of said saw, having cut-away faces adjacent the saw to provide a sharp supporting edge on either side of the base of the teeth being set, a reciprocating saw-setting plate adapted to engage with alternate teeth of the saw to set the teeth adjacent the engaging blocks, a handle connected to said saw-setting plate, to reciprocate it, a cam depending from said handle into a slot in said plate, a plunger located in the base of said slot, engaging with said cam, a rocking lever carried on the base of said plate, having one end engaging with the plunger and the other carrying a pawl pivotally mounted thereon, engaging the successive teeth of the saw, and yielding means adapted to move said lever and pawl downwardly at one end, whereby as said lever is reciprocated the teeth will be alternately set, and between the setting operation of each tooth the pawl will move the saw to present a fresh tooth for setting.

7. In a saw-setting machine, a saw-setting table adapted to accommodate a saw moving vertically therethrough, adjustable guide blocks engaging either side of said saw, having cut-away faces adjacent the saw to provide a sharp supporting edge on either side of the base of the teeth being set, a reciprocating saw-setting plate adapted to engage with alternate teeth of the saw to set the teeth adjacent the engaging blocks, a handle connected to said saw-setting plate, to reciprocate it, a cam depending from said handle into a slot in said plate, a plunger located in the base of said slot, engaging with said cam, a rocking lever carried on the base of said plate, having one end engaging with the plunger and the other carrying a pawl pivotally mounted thereon, engaging the successive teeth of the saw, yielding means adapted to move said lever and pawl downwardly at one end, whereby as said lever is reciprocated the teeth will be alternately set, and between the setting operation of each tooth the pawl will move the saw to present a fresh tooth for setting, and means to limit the movement of said pawl.

8. In a saw-setting machine, a saw-setting table adapted to accommodate a saw moving vertically therethrough, adjustable guide blocks engaging either side of said saw, having cut-away faces adjacent the saw to provide a sharp supporting edge on either side of the base of the teeth being set, a reciprocating saw-setting plate adapted to engage with alternate teeth of the saw to set the teeth adjacent the engaging blocks, a handle connected to said saw-setting plate, to reciprocate it, a cam depending from said handle into a slot in said plate, a plunger located in the base of said slot, engaging with said cam, a rocking lever carried on the base of said plate, having one end engaging with the plunger and the other carrying a pawl pivotally mounted thereon, engaging the successive teeth of the saw, yielding means adapted to move said lever and pawl downwardly at one end, whereby as said lever is reciprocated the teeth will be alternately set, and between the setting operation of each tooth the pawl will move the saw to present a fresh tooth for setting, means to limit the movement of said pawl, and means to limit the reciprocatory movement of the handle.

9. In a saw-setting machine, a saw-setting table adapted to accommodate a saw moving vertically therethrough, adjustable guide blocks engaging either side of said saw, having cut-away faces adjacent the saw to provide a sharp supporting edge on either side of the base of the teeth being set, a reciprocating saw-setting plate adapted to engage with alternate teeth of the saw to set the teeth adjacent the engaging blocks, a handle connected to said saw-setting plate, to reciprocate it, a cam depending from said handle into a slot in said plate, a plunger located in the base of said slot, engaging with said cam, a rocking lever carried on the base of said plate, having one end engaging with the plunger and the other carrying a pawl pivotally mounted thereon, engaging the successive teeth of the saw, yielding means adapted to move said lever and pawl downwardly at one end, whereby as said lever is reciprocated the teeth will be alternately set, and between the setting operation of each tooth the pawl will move the saw to present a fresh tooth for setting, means to limit the movement of said pawl, means to limit the reciprocatory movement of the handle, and means to prevent the saw from moving backwardly away from the saw-setting plate.

In testimony whereof, I affix my signature.

GEORGE CLAUSING.